3,027,514
ELECTRICAL WAVE INDICATOR FOR HIGH
FREQUENCY LINES
James R. Bird, Chagrin Falls, and Harold E. Stevens,
Cleveland, Ohio, assignors to Bird Electronic Corporation, Cleveland, Ohio, a corporation of Ohio
Filed May 5, 1951, Ser. No. 224,762
18 Claims. (Cl. 324—95)

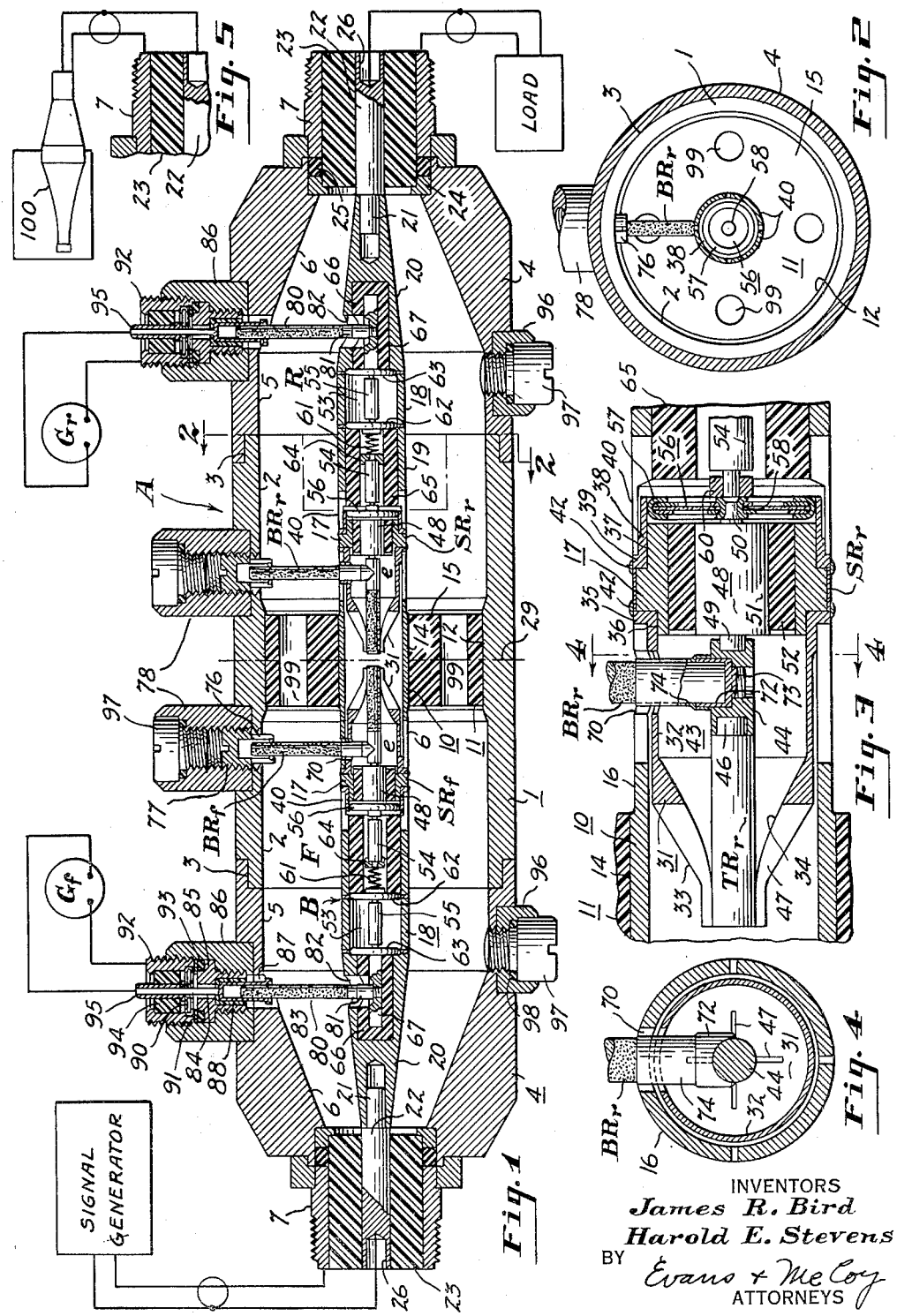

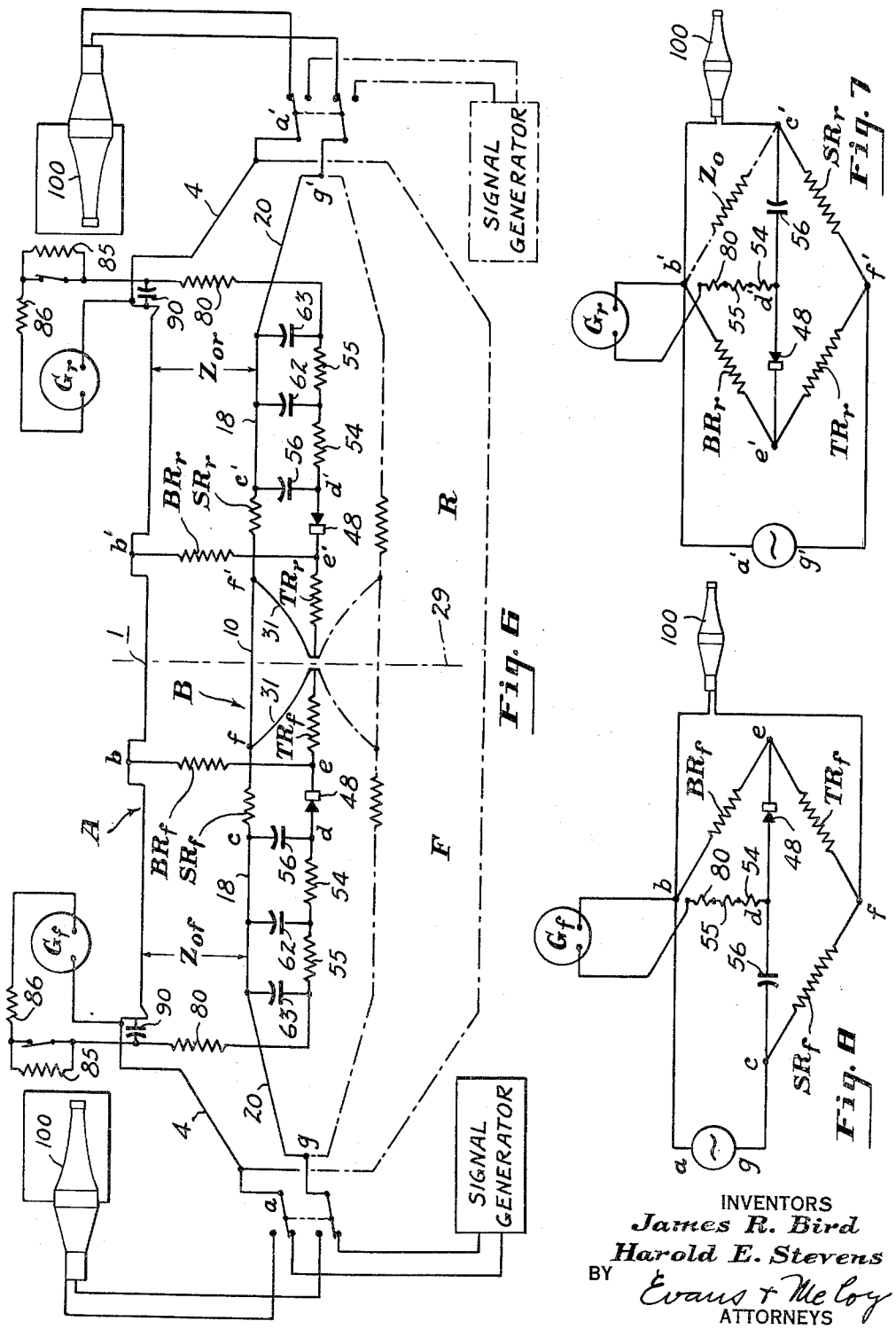

This invention relates to indicators or meters for high frequency electrical energy and more particularly to the sampling for measurement and like purposes of wave energy transmitted along a coaxial line. A particularly useful specialized version of the invention pertains to a non-frequency selective directional coupler or sampler also called a reflectometer or insertion meter for direct measurement of high frequency travelling wave energy in such a line, the device incorporating a pair of circuits each responsive only to wave energy travelling in a single direction which is opposite to that of the wave energy to which the other circuit responds. The invention is also useful in other ways of which some are less complex.

It has been heretofore recognized that measurements of high frequency energy being transmitted over coaxial and waveguide lines can be obtained by measuring separately the forward and the backward or reflected energy or wave magnitude. Conventional procedures and devices for such measurements are complicated, costly or unwieldy or have not been entirely satisfactory as to reliability or accuracy of results. The method and apparatus of the present invention, however, are extremely simple. Practical devices embodying the invention can be easily produced in quantity at relatively low cost and they can be installed and utilized by individuals not having special skills. Yet reliable, accurate results are uniformly obtained. It is feasible by utilizing the simple method and apparatus of the present invention simultaneously to make separate measurements of the forward travelling and the reflected waves in a coaxial line. These measurements are effective and sufficiently accurate over a relatively wide band of high frequencies so that an instrument in which the invention is embodied is not objectionably frequency sensitive or selective and has increased adaptability and utility.

One of the principal objects of the present invention is, therefore, to provide a device for use with a coaxial transmission line, preferably by insertion therein, to measure high frequency transmitted electrical energy. According to certain of its broader aspects, the invention is concerned with improvements in directional instruments or instrument components of the type responsive only to wave energy travelling in a predetermined direction along a coaxial line and insensitive or nonresponsive to oppositely travelling energy. In devices utilizing such directional components, measurement of the oppositely travelling or reflected energy is intended to be effected by a reversing arrangement or a duplicate instrument or component connected in series with the first or combined with it in a reflectometer unit capable of indicating the net energy transmitted along the line.

In its broader aspects concerned with measurement of high frequency power the invention contemplates an arrangement in which a series resistor is included in one of the conductors of a coaxial transmission line and a voltage divider comprising a pair of series connected resistors is connected across the line and combined in a circuit with the series resistor. One, preferably the larger, of the voltage dividing resistors is disposed radially across the electrostatic field of the line, and the other, preferably the smaller, comprises one component of a reflectionless termination. The series resistor obtains a voltage sample which is a measure of the current on the line while the voltage sample or drop taken across one of the resistors of the voltage divider is a measure of the voltage across the line. These voltage samples, representing line current and voltage are combined in accordance with bridge circuit theory. An instrument such as a galvanometer is then made to respond to the detector arm of the bridge.

The characteristics of high frequency wave energy are such as to introduce objectionable interferences and reflections in coaxial systems having components so connected across the transmission line that low impedance conductors are disposed radially across the annular dielectric space separating the inner and outer line conductors. In bridge circuits the problem is so complicated by the multiplicity of connections involved that bridge effects, common in the art of low frequency electrical measurement, have not found wide application in high frequency instruments.

Another of the principal objects of the invention is, therefore, to provide an improved method of and apparatus for measuring high frequency waves in a coaxial transmission line by a system in which a bridge circuit is employed, in which objectionable reflections and interferences with the travelling wave energy are minimized, and in which frequency selectivity is avoided permitting accuracy over a relatively wide band of operating frequencies. This phase of the invention, more fully developed, contemplates the use of resistors in a high frequency sampling circuit, the resistors being of such character and being so arranged that the circuit remains substantially non-reactive at all frequencies and provides an instrument substantially unaffected by frequency changes.

Another object is to provide an apparatus of the character mentioned wherein components of a bridge circuit or circuits are combined with a coaxial line section as a substantially reflectionless unit suitable for insertion in a coaxial transmission line.

Another object is to provide a coaxial electrical indicator unit wherein one or more components of a sampling circuit are located physically within the diameter of the center conductor of the coaxial unit. More specifically, and preferably in connection with an insertable indicator unit, it is sought to locate certain components of a bridge circuit or circuits within the diameter of the inner conductor of the coaxial line indicator unit, locate other components outside the coaxial line unit but connected to those components within the inner conductor, and yet without introducing reflections maintain the charcteristic impedance of the unit substantially uniform along its length at a predetermined value equivalent to that of the main transmission line in which the indicator unit is inserted.

In the provision of a structure of the character mentioned, in which components of a branch or sampling circuit, such components preferably taking the form of a coax, are inturned or arranged inside the center conductor of the principal transmission line, there is obtained a combination of improved physical structure or "geometry" giving short paths or connections and that is particularly advantageous in instruments employing a bridge circuit. As will appear, the bridge circuit is balanced to provide the desired directional charcteristics and the inturned arrangement of the sampling coax is effective in maintaining the balance of the bridge circuit over a wide frequency band.

Another object is to provide a high frequency electrical measuring instrument or indicator wherein a resistive voltage divider or equivalent samples energy transmitted over a coaxial line to energize a sampling circuit that includes a coax within the center conductor of the transmission line. In a preferred arrangement concerned with this phase of the invention, the voltage divider includes as one component a resistor forming an element of a reflectionless termination disposed substantially wholly within the center conductor of the transmission line, the other resistive component of the voltage divider being immersed in the electrostatic field of the transmission line. In a still more precisely arranged combination, the termination resistor has an axis of symmetry and is disposed with such axis parallel to and preferably coaxial to the conductors of the transmission line.

Another object is to provide, in combination with a high frequency coaxial transmission line having a hollow center conductor and a sampling circuit associated with the line for purposes of instrumentation or the like, improved means for connecting components of the sampling circuit which are external to the line to a component or components located within the hollow center conductor. The invention is particularly concerned with the combination of a relatively low impedance transmission line and a relatively high impedance sampling circuit wherein an elongated resistive element of the sampling circuit is disposed, preferably radially, across the space between the outer conductor and the center conductor of the transmission line and is insulated from each. The radial resistive element, which has an impedance many times that of the transmission line, is effective to carry low order energy sufficient for instrumentation purposes, but produces in the transmission line no objectionable reflections or similar effects of a serious character.

Other objects and advantages of the invention reside in combinations and arrangements of parts and features of design and construction which provide simplicity and economy in manufacturing, servicing and repairing the devices and which also provide improved operating characteristics. The various objectives will become apparent as the description proceeds, such description being made with reference to the accompanying drawings forming a part of the specification.

In the drawings:

FIGURE 1 is a longitudinal sectional view, partly diagrammatic, through an insertion wave indicator or reflectometer incorporating the principles of the present invention for use in a high frequency coaxial transmission line;

FIG. 2 is a sectional detail, with parts removed, taken substantially along the line indicated at 2—2 of FIG. 1;

FIG. 3 is a longitudinal sectional detail, enlarged with respect to FIG. 1, showing a portion of the inner conductor of the main or transmission coax and one of the minor or inner coaxial lines of the reflectometer;

FIG. 4 is a transverse sectional detail through the inner conductor of the main coaxial line take substantially along the line indicated at 4—4 of FIG. 3;

FIG. 5 is a diagrammatic detail, partly in section, showing the connection of a reflectionless termination to the reflectometer for test and calibration purposes;

FIG. 6 is a schematic diagram of the reflectometer or wave indicator representing the circuit and electrical components employed in the combination;

FIG. 7 is a schematic wiring diagram of the reflected wave indicating components comprising the right hand end of the device shown in FIGS. 1 and 6, being illustrative of the principle embodied in the bridge circuit of the present invention as presented to wave energy travelling in a reverse direction to that which the reflectometer components represented are arranged and adjusted to indicate or measure; and FIG. 8 is a schematic wiring diagram of the forward wave indicating components comprising the left hand end of the device, being illustrative of the principle of the bridge circuit presented to wave energy travelling in the direction the reflectometer components represented are arranged and adjusted to measure or indicate.

In the design of devices used in high frequency coaxial circuits, particularly in the very high and ultra high ranges where frequencies of several thousand megacycles are common, consideration must be given to the physical arrangement and relationship of component elements and parts employed in the combination as well as to the electrical characteristics of the individual elements. Not infrequently theoretical solutions of problems that occur in the art of high frequency circuits are obtained on paper but cannot be put into practice and adopted for the reason that suitable component elements capable of being arranged and combined to satisfy the electrical solution are not available. The use in combination of such components as may be available often results in unsatisfactory results that do not follow the theoretical or paper solutions based on electrical considerations alone.

The reflectometer shown, although intended for use as an insertion device in measuring both forward travelling and reflected wave energy on a coaxial transmission line, embodies a number of subcombinations and units finding varied uses in the high frequency fields in connection with circuits employing coaxial lines. For convenience in establishing the relationship of the physical components, the structure of the reflectometer is first described in detail after which its functions and the electrical relationships of the components are described in connection with the schematic wiring diagrams.

The device comprises a coaxial line section for insertion in a transmission line. It is designed according to known principles with a characteristic impedance of, say, about 51.5 ohms, using a suitable mineral oil dielectric coolant in the annular space between the conductors. A metal outer conductor A comprises the body of the device and includes a substantially cylindrical tube 1 which may be grounded in the system. The tube has smooth internal cylindrical surfaces 2 and is formed at its ends to receive identical end members 4, also of metal such as brass, that have cylindrical internal surface portions 5 matching and extending as continuations of the cylindrical body surfaces 2. The end members may be connected to the body as by telescopic joints 3 and have internal conical surfaces 6 aligned with the cylindrical portions 5. The conical surface portions 6 constitute the outer conductors of transition sections which, at opposite ends of the reflectometer, increase and decrease the diameter of the coaxial line of which the reflectometer constitutes a part.

For convenient insertion and removal of the reflectometer with respect to a transmission line, the end members 4 include line connector components of conventional character. These connector components may each include an externally threaded tubular fitting 7 having a cylindrical internal surface coaxial to the cylindrical and conical surfaces mentioned.

Extending longitudinally through the outer conductor A is an inner conductor B of circular section coaxial to the cylindrical surfaces 2 and 5 of the outer conductor. The inner conductor includes a metal tube 10 supported intermediate the ends of the inner chamber of the reflectometer by a dielectric ring 11 formed of an insulating material such as polytetrafluoroethylene. The ring 11 thus divides the interior of the reflectometer into equal annular chambers F and R. As will appear, the reflectometer is symmetric, or substantially so, about a radial plane through the center of the dielectric ring 11. On opposite sides of the center plane are similar, in fact in the present case identical, components reversely arranged. That portion of the device located to the left of the central plane, as viewed in FIG. 1, is utilized, in the present description, in the indication or measurement of waves travelling forwardly or to the right, and that portion disposed to the right of the center plane, as viewed in the same figure, is utilized, in the present description of the invention, in the measurement or indication of reflected waves or waves travelling reversely or to the left. It is obvious, of course, that by reversing the reflectometer end for end, the device will operate in the same manner since the measurement and indication of the forward travelling and reflected waves is determined by the relationship of the reflectometer components to the transmission line, the components at both ends of the device or on both sides of the median plane being capable of measuring either forward travelling or reflected wave energy depending upon the manner in which the reflectometer is connected or inserted into the transmission line.

To maintain a uniform characteristic impedance along the length of the line, the dielectric ring 11 is received, as by a press fit, within a reduced diameter cylindrical portion 12 of the body member 1, and central portion 14 of the inner conductor tube 10 which is embraced by the dielectric ring is of slightly larger diameter than axially slotted end portions 16 of the tube which project axially beyond radial faces 15 of the ring.

Aligned with the central tube 10 and connected thereto by ceramic bodies 17 of circular section, to be later described, are circular sectioned elements 18 of the inner conductor B which may take the form of hollow brass turnings. Each of the brass conductor elements 18 includes a cylindrically surfaced portion 19 and a tapered portion having a conical surface 20 disposed respectively within cylindrical and conical portions of the outer line conductor A. The small diameter ends of the conductor elements 18 are drilled to receive reduced diameter ends 21 of cylindrical rods 22 supported in tubular dielectric bodies 23 press fitted in the tubular connector fittings 7.

At each end of the device the connector assembly includes a metal ring 24 received in a counterbore in the end of the end member 4. A shallow radial shoulder on the ring locates the dielectric member or tube 23. A circular sectioned sealing or O-ring 25 embraces the dielectric tube within the counterbore of the end member and is axially compressed between the locating ring 24 and the tubular fitting 7 to provide a seal which prevents escape of liquid dielectric coolant contained in the chambers F and R.

Coaxial lines to a signal generator and a load, or the ends of a line parted to receive the reflectometer, are attached to the ends of the device by conventional fittings, not shown, including threaded means for engaging the threads on the tubular or outer members 7 of the connectors. Center conductor elements of the line fittings contact tubular slotted ends 26 of the center conductor rods 22.

The outer tubular body member 1 with the end members 4 and the tubular fittings 7 of the end connectors constitute the outer conductor of a main or primary coaxial line which carries the energy or travelling waves of the coaxial line in which the device is inserted. The inner conductor of this main or primary coaxial line comprises the center tube 10 together with the circular sectioned conductor elements 18, the connector rods 22 supported within the tubular connectors 7 by the dielectric bodies 23 and series resistors SR$f$ and SR$r$ each comprising a deposited film conductor of carbon or other suitable material carried by one of the ceramic bodies 17. As will appear in the development of the bridge circuit employed in the present coupling device, a sample of the current of the travelling wave being measured is obtained by passing the current through the series resistor SR$f$ (or SR$r$), this current sampling resistor being very small in value relative to the impedance of the main transmission line and being so arranged that the characteristic impedance of the transmission line is carried through the resistive section. The series resistor, thus disposed in the surface generated by the surface of one of the transmission line conductors, or substantially so, is also axially relatively short. Its axial length is but a small fraction of the wave length of the highest frequencies of the wave band to be carried by the line. In the illustrated device each series resistor, in the form of a cylindrical film band, is several times greater in diameter than in axial length. In applications wherein the series resistor is located, say, at or adjacent the surface generated by the outer conductor of the line, the ratio between conductor diameter and resistor axial length is even more pronounced, it being desired that the current sample be taken over the shortest practicable length of the main transmission line.

Within the inner conductor B of the main coaxial line, preferably concentric thereto, are supplemental or minor branch coaxial lines that are components of circuits which function independently of each other. One of the branch or supplemental coax assemblies is associated with the left end, as viewed in FIG. 1, and is part of the circuit to measure or indicate forward travelling waves on the main line. The other branch coax is associated with the right end of the device, as viewed in the same figure, and is part of the circuit to measure reflected waves.

The halves of the reflectometer on opposite sides of the median plane, although reversely arranged, comprise identical elements which are indicated by the same reference numerals. Letters of reference that identify components of the electrical circuits carry the suffix "$f$" when applied to parts of the device being considered in connection with measurement or indication of forward travelling waves, while the parts being considered in connection with reflected wave energy carry the suffix "$r$."

The minor coax assemblies each comprises a circular sectioned conductive element 31 which may take the form of a turning of a suitable metal such as brass. This element includes a tubular cylindrical portion 32 embraced by one of the slotted ends of the center tube 10 and an end portion 33 having a tapered internal face 34. The internal taper of such face is curved in accordance with principles set forth in copending application for patent, Serial No. 692,116, filed August 21, 1946, now Patent No. 2,552,707, to form the outer conductor of a reflectionless termination of the minor coax. At its end remote from the curved termination surface 34 the element 31 of the minor coax is formed with an outwardly directed radial flange 35 against which the end of the center tube 10 abuts and is thereby located in assembly.

The ceramic body 17 carrying the deposited carbon film resistor SR$r$ (or SR$f$) is of circular section and has a cylindrical surface of the same diameter as the circular flange 35 to maintain the diameter ratio of the main coax along the length of the series resistor. Circular rabbets 36 and 37 are formed as by turning or grinding the ends of the ceramic body 17, the reduced diameter end provided by the rabbet 36 being received and cemented within the open end of the coax element 31. The flange 35 of the coax element abuts the shoulder of the ceramic body provided by the rabbet, the parts being cemented together prior to insertion into the inner conductor tube 10 of the main coax.

The reduced end of the ceramic body 17 provided by the rabbet 37 receives and is cemented in a metal sleeve 38 having a radial flange 39 abutted against the shoulder at the end of the rabbet. The flange has a cylindrical outer face of the same diameter as the cylindrical surfaces of the resistor body 31 and the flange 35 of the coax element. Adjacent their flanges the external surfaces of the coax element 31 and of the tubular sleeve 38 are formed with raised axially short circumferentially extending seats embraced by the extreme ends of the axially disposed finger portions 16 of the tube 10 and similar finger portions 40 comprising the slotted end of the inner conductor element 18. As shown in FIG. 3, the open end of the cylindrical portion 19 of the inner conductor element is counterbored to decrease the radial thickness of the finger portions 40 thus permitting flexing of the finger portions in assembly.

Electrical connection is established between the cylindrically shaped resistive film SR$r$ (or SR$f$) and the cylindrical surfaces of the adjacent flanges 35 and 39 as by conductive bands 42 (FIG. 3) of silver paint or other suitable conductive material applied at the joint. The paint film flows into any crack or crevice that may be present in the joint, providing a smooth transition between the metal of the inner conductor and the resistive carbon film.

Extending longitudinally through chamber 43 of the internal or minor coax is the center conductor of the latter, this center conductor comprising a cylindrical metal rod 44 and a resistive component TR$r$ (or TR$f$) which may take the form of a cylindrical ceramic rod or tube of the same diameter as the conductor rod 44 and carrying on its surface a resistive film of deposited carbon. One end 46 of the resistor rod or cylinder is reduced in diameter and is received telescopically within a bore provided in the end of the rod 44, the parts being cemented together in axially aligned relation. Suitable means such as a band of conductive silver paint, not shown, covers the joint between the resistive carbon film and the metal rod 44. The other end of the ceramic resistor rod is embraced by the small diameter end of the coax element 31, the latter having axial slots 47 to provide resilient finger portions which yieldingly embrace the end of the rod. Thus an electrical connection is maintained between the carbon film on the ceramic resistor rod and the internal tapered surface 34 at the small diameter end of the coax element 31. It is apparent, from a consideration of the principles set forth in the patent application referred to, that the cylindrically shaped resistive film on the ceramic rod and the logarithmically tapered surface 34 constitute a reflectionless termination on the minor or branch coax.

The resistor element TR$r$ (or TR$f$) not only forms part of the center conductor of the inside or minor coaxial line and is combined with the tapered surface conductor element 31 in the provision of a reflectionless termination to such minor coax but also comprises one component of a resistive voltage divider. A bridging resistor BR$r$ (or BR$f$), to be later described, comprises the other component of the voltage divider, the principles of the divider being set forth in copending application for patent Serial No. 191,805, filed October 24, 1950, now Patent No. 2,700,749.

So that the presence and magnitude of wave energy on the inside coax can be detected or registered on an instrument external to the main transmission line, the wave energy is rectified, in the present arrangement within the inner conductor B of the transmission line, and the rectified energy impressed on a high resistance circuit which includes a galvanometer G$r$ (or G$f$) which may be of the d'Arsonval type. Connection for the galvanometer circuit is made to the rod 44 of the inside coaxial line by a crystal rectifier assembly or diode 48 located at the end of the rod opposite the termination resistor TR$r$ (or TR$f$).

This rectifier may conform to any of several well-known constructions, a suitable arrangement comprising a germanium pellet contacted by a platinum ruthenium whisker wire. The so-called welded germanium diodes, type G7, manufactured by General Electric Company, Syracuse, New York, are satisfactory. The germanium pellet and the whisker wire are carried by or connected to metal conductor components 49 and 50 projecting axially from opposite ends of a cylindrically shaped molded plastic case 51. A shallow bore in the end of the rod 44 receives the rectifier conductor wire 49 in end to end axially aligned relation, the parts being soldered to provide a good electrical connection. The rectifier assembly is centered and axially disposed within the cylindrical center opening of the ceramic body 17, a dielectric sleeve 52 of polyethylene or similar material being disposed in the annular space between the ceramic body and the rectifier to support the latter.

A conductive assembly of high resistance extends longitudinally through chamber 53 of the hollow conductor element 18 and carries D.C. energy to which the externally located galvanometer is subjected. A pair of resistors 54 and 55 are disposed in end to end relation for series connection in the galvanometer circuit, these resistors being associated with button capacitors 62 and 63 in the provision of an RC filter which isolates or protects the rectifier 48 from unwanted high frequency energy while permitting the passage of the D.C. energy to which the galvanometer responds. The button capacitors are disposed across the chamber 53, each capacitor having a center eyelet that receives and is soldered to one of the terminal wires projecting from opposite ends of the resistor 55. Associated with the rectifier is a charge capacitor 56 which in combination with the resistors and other components of the galvanometer circuit provides the desired time constant for such circuit to maintain peak potential whereby a peak reading galvanometer is obtained. The charge capacitor 56, of say, from about 10 to about 20 micro-micro-farads, here about 14 micro-micro-farads, is of the button type having flat circular plates of different diameters held against an insulating disc by an inner eyelet 58 and an outer clamping ring 57. It is received against one end of the ceramic body 17. The outer metal ring 57 of the capacitor is embraced by and soldered to an end portion of the metal sleeve 38 which projects axially beyond the end of the ceramic body 17. The inner metal ring or eyelet 58 of the capacitor receives and is soldered to the terminal wire 50 of the rectifier.

A metal collar 60 soldered on one of the terminal wires of the resistor 54 is yieldingly held in contact against the center eyelet 58 of the charge capacitor 56 by a helical coil conductive metal compression spring 61. The other terminal wire of the resistor is soldered to a circular sectioned metal slide 64 guided in the bore of a dielectric or insulating sleeve 65 which closely fits the internal cylindrical walls of the tubular portion 19 of the conductor element 18. The spring 61 is interposed between the slide 64 on the resistor 54 and the center eyelet of the button type filter capacitor 62, preferably being soldered to each.

An axial bore within the tapered portion 20 of the inner conductor element, the bore being continuous with the chamber 53, receives an insulating cup 66 of suitable dielectric material such as polyethylene. This cup receives and supports a cylindrical metal rod 67 one end of which seats in the bottom of the dielectric cup and the other end of which projects through the dielectric cup and is soldered to the center eyelet of the button or filter capacitor 63.

The capacitors 62 and 63 are preliminarily assembled on and soldered to the ends of the terminal wires of the resistor 55, the rod 67 is soldered to the center eyelet of the capacitor 63, and the capacitor-resistor-rod assembly is then slid axially through the chamber 53 of the conductor element 18 to position the rod 67 as shown. The outer rings of the capacitors are connected to the inside surface of the conductor element 18 by solder run into position through radial holes in the conductor.

The resistors 54 and 55 are of suitable high resistance to isolate the galvanometer circuit and to provide the desired time constant. In practice it has been found satisfactory to use type BTS resistors as made by International Resistance Company of Philadelphia, Pennsylvania, resistor 54, serving principally as a charge resistor being in the neighborhood of about 9000 ohms and resistor 55, serving principally as an isolation resistor being in the neighborhood of about 2000 ohms. These particular resistances are not critical and can be varied. The filter capacitors 62 and 63 are larger than the charge capacitor 56, each being of the order of about 500 micro-micro-farads, although the value is not critical. Button capacitors as made by Erie Resistor Corporation are suitable for the filter capacitors as well as the charge capacitor 56 and a filter capacitor 90, later described.

As mentioned above, a resistance voltage divider is connected across the inner B and the outer A conductors of the main transmission line, the terminator resistor TR$r$ (or TR$f$) comprising one component of such divider. The other component of the resistive voltage divider takes the form of a thin carbon film BR$r$ (or BR$f$) deposited on a cylindrical ceramic rod which extends radially across the annular space separating the conductors A and B of the main transmission line. The inner end of the ceramic resistor rod is embraced in a thin-walled tubular end portion of a short cylindrical metal rod 72. This rod or fitting has a reduced diameter end threaded at 73 into a tapped radial hole formed in a spot face on the center metal rod 44 of the minor coax. Conductive metal paint 74 is employed in a band at the joint between the metal rod 72 and the carbon film on the resistor rod to provide a smooth transition. Apertures or windows in the conductor tube 10 and the element 31 of the minor or inner coax are aligned to provide a passage 70 for the bridging resistor. This passage also connects the annular dielectric chamber R (or F) of the main transmission line with the chamber 43 of the inner coaxial line for admission into the latter of liquid coolant dielectric.

At its outer end the bridging resistor rod is embraced by resilient finger portions 76 formed by axial slots in the tubular end of a metal screw 77 adjustable axially in the threaded bore of a tubular boss 78 soldered to the outside of and projecting radially from the main tubular body 1 of the transmission coax. The ends of the fingers 72 which grip the resistor rod and make electrical line contact with the carbon film on the latter are provided internally with smooth offset surfaces to avoid objectionable abrasion or damage to the carbon film. Rotation of the adjusting screw 77 in the tubular boss 78 shifts the screw and the annular line contact of the fingers 76 axially along the carbon film of the resistor to vary the effective length of the resistor and its resistance.

A galvanometer G$r$ (or G$f$) is connected to the rectifier 48 through a circuit one conductor of which extends axially through the chamber in the conductor element 18 and which includes the resistors 54 and 55. The connection between the rectifier and related components of the galvanometer circuit which are located internally of the main transmission coax and the galvanometer or indicator which is located externally of the main coax is affected by a carbon film conductor carried by a ceramic rod 80 that extends radially across the dielectric space separating the inner and outer conductors B and A of the transmission coax. At its inner end, the cylindrical rod 80 is pressed into a thin-walled cup formed on the end of a cylindrical metal fitting 81. A press fit telescopic joint with a band of conductive metal paint such as used between the bridging resistor BR$r$ (or BR$f$) and the metal rod 72 is suitable. The fitting 81 extends through an opening or window 82 in the tapered portion 20 of the conductor element 18, through the dielectric cup 66, and has a reduced end threaded and received in a tapped radial hole in a spot face on the rod 67. At its outer end, the resistor rod is received in adjustable contact cup 83. This metal cup is axially slotted through its open end to provide a number of contact fingers which yieldingly grip the ceramic rod, the inner faces of the fingers being formed to make substantially circular line contact at the end of the cup with the carbon film on the rod. A guide rod 84 secured to the bottom of the contact cup extends in axial relation to the resistor rod 80 outwardly through the bottom of a thin-walled insulating dielectric cup 88 and through an axial clearance in sleeve 85, the sleeve being threaded into the bore of a tubular boss 86 secured to the end member 4 of the main transmission line. An opening or window 87 is formed in the wall of the end member 4 of sufficient size to provide a clearance about the contact cup 83 so that the line of contact between the cup fingers and the carbon film on the resistor rod 80 is disposed substantially in the plane of the opening. Likewise the line of connection between the resistive film on the rod 80 and the metal fitting 81 is located substantially in the surface generated across the opening 82 by the surface of the tapered portion 20 of the conductor element 18. Thus, the resistive carbon film on the ceramic rod 80, while serving as a satisfactory conductor for the low order D.C. currents of the galvanometer circuit, embodies the bridging resistor principles set forth in the patent application referred to. Objectionable capacitance effects and reflections which would result from positioning a metal conductor of ordinary character across the dielectric space between the inner and outer conductors of the coaxial line are avoided.

Any high frequency currents that may be present on that portion of the galvanometer circuit disposed within the main coaxial line are excluded from the external portion of the galvanometer circuit including the sensitive galvanometer itself as by a button capacitor 90 received about the extension rod 84. The center eyelet of the capacitor accommodates the guide rod to which it may be soldered after assembly. The outer ring of the capacitor is compressed between and makes electrical contact with a metal washer 91 received in a threaded counterbore of the boss 86 and a threaded closure sleeve 92 screwed into such counterbore. A deformable rubber O-ring or gasket 93 is compressed by the ring 91 in an annular rabbet formed in the upper end of the threaded sleeve 85 to seal the joint and prevent the loss of liquid dielectric coolant oil from the main coaxial or transmission line. Within the externally threaded sleeve 92 is an annular dielectric insulator 94 which embraces and supports a tubular contact element 95 soldered on the upper end of the extension rod 84. By the structure described, a positive electrical connection is effected through and insulated form the boss 86 and the outer conductor of the main coax to the carbon film on the rod 80. Thus the galvanometer G$r$ (or G$f$) in the external portion of the galvanometer circuit and at a remote location is connected by a single cable to both the outer conductor of the main coax, which may represent the ground of the system, and to that portion of the galvanometer circuit which includes the rectifier detector located within the inner conductor of the main coax. A suitable cable connection for the external galvanometer circuit may be such as disclosed in patent application Serial No. 173,776, filed July 14, 1950, now Patent No. 2,472,625.

To complete the galvanometer circuit a connection is required between the inner conductor B and the outer conductor A of the main transmission line. This connection is usually effected beyond the present device as by the particular line termination employed or the pickup link in the transmitter. When the present insertion device is used in a coaxial system which does not provide a direct ground path between the inner and outer conductors B and A the connection is provided by parallel resistive paths each of which comprises one of the bridging resistors and one of the termination resistors. One path includes the bridging resistor BR$f$ and the termination TR$f$ connected in series between the inner and outer conductors of the main transmission line. Another and parallel path includes the bridging resistor BR$r$ and the termination TR$r$, also connected in series between the inner and the outer conductors of the main transmission line. When relying on the parallel resistive paths mentioned to complete the galvanometer circuit, the galvanometer is calibrated for such condition. The same instrument can be used, of course, in a coaxial system providing an external D.C. connection between the inner and outer conductors of the transmission coax if there is inserted in the galvanometer circuit a suitable compensating resistance 85 comparable to the effective value of the parallel resistive paths described. The resistance 85 and a calibrating resistance 86 are located within the box or container housing the galvanometer, a switch being provided for shorting out the supplemental resistance 85 when the device is used in a system not having the external D.C. connection mentioned.

An air or inert gas dielectric can be employed in the reflectometer chambers, in which case the diameter ratios of the inner and outer conductors of the several coaxial components are calculated pursuant to well-known principles so as to maintain the desired characteristic impedance at all sections, it being remembered that the supplemental or branch coax comprising the metal rod 44 and the metal turning 31 has substantially the same characteristic impedance as the main coax comprising the outer conductor A and the inner conductor B. As a preferential arrangement, however, the annular dielectric spaces of the coaxial lines and the chambers communicating with such spaces are filled with a suitable inert liquid dielectric coolant. Any of several low viscosity mineral oils can be used, the dimensions of the inner and outer conductors of the coaxial lines being calculated with reference to the dielectric constant of the particular mineral oil or other liquid employed. The liquid dielectric is charged into the reflectometer through openings in bosses 96 normally closed by plugs 97 and sealing O-rings 98 interposed between circular shoulders on the threaded plugs and the bottoms of counterbores provided in the bosses. Similar screw plugs and sealing O-rings are used to close the openings in the bosses 78 described in connection with the bridging resistors. A number of axial through openings or passages 99 are provided in the dielectric ring 11 that supports the middle of the inner conductor B of the main coax.

In operation, the reflectometer is inserted in a coaxial transmission line between a transmitter or signal generator and a receiver or load as indicated diagrammatically in FIG. 1. The galvanometer $Gf$ can then be made to read the magnitude of the wave energy travelling from the signal generator to the load, or forwardly, while the galvanometer $Gr$ can be made to measure the magnitude of reflected wave energy or energy travelling in a reverse direction from the load toward the signal generator.

The operation of the reflectometer is explained in connection with the schematic arrangements of FIGS. 6 through 8. FIG. 6 is a symbolic illustration representing a longitudinal section through the reflectometer similar to or such as shown in FIG. 1. The conductors A and B are designed, as mentioned previously, to provide a characteristic impedance $Z_0$ corresponding to that of the coaxial system in which the unit is to be used. In the illustration embodiment, the conductors provide a characteristic impedance of about 51.5 ohms, using mineral oil as a dielectric coolant in chambers F and R. The symbols are located in the relative positions of the reflectometer components which they represent.

The reflectometer circuits for measuring or indicating the forward travelling and the reverse travelling waves can each be represented conveniently as a bridge in which the series resistor $SRf$ (or $SRr$) comprising carbon film on the ceramic body 17 is connected in series with the carbon film resistors of the resistance voltage divider. The fourth side of the bridge circuit is represented by either the characteristic impedance of the transmission line or by the signal generator or transmitter, depending upon the relative direction of the travelling wave that is to be indicated by the galvanometer.

FIG. 7 represents the bridge circuit presented to a traveling wave moving in that direction for which a response is not desired in the indicator or galvanometer, while FIG. 8 represents the bridge circuit presented to a travelling wave moving in that direction for which a response is desired. Consideration will be given in detail to the reaction of the reflectometer components to forwardly travelling waves moving from left to right and to the reflected waves moving from right to left, it being understood that the reflectometer components react similarly, though reversely, when the forwardly travelling wave originates at the right and the reversely travelling or reflected wave originates at the left.

The four sided bridge circuit that comprises the resistors $SRf$, $BRf$ and $TRf$ and the transmission line impedance, has opposite corners connected by the radio frequency detector arm of the bridge which comprises the series connected diode 48 and the charge capacitor 56. A potential across this detector arm resulting from imbalance of the bridge is sensed by the galvanometer $Gf$ which is thus a secondary detector responding to the direct current from the primary detector or diode 48. A high frequency sampling circuit is thus located physically within the main transmission line, in combination with a direct current detector circuit so arranged that a rectified voltage from a sampled energy wave is carried out through the electrostatic field between the transmission line conductors to an external detector or galvanometer without substantial interference with the wave energy of the main line.

The operation of the reflectometer is described in connection with a suitable test arrangement employed in adjusting the bridge. A signal or travelling wave is fed first into one end of the device, the opposite end being connected to a reflectionless termination, and then the direction of the travelling wave energy is reverse so that the signal is fed into the opposite end and so that the first end is connected to a reflectionless termination. In practice it is feasible to employ a single termination and a single signal generator which are connected to opposite ends of the present insertion reflectometer for making one or the first phase of the test. The generator and termination are then disconnected, the reflectometer reversed, and the generator and termination connected in reversed relation for the other or second phase of the test. This arrangement is illustrated in FIGS. 1 and 5, the latter showing a reflectionless termination 100 connected to one end of the reflectometer in lieu of the imperfect load. In FIG. 6 the "reversing" of the reflectometer or wave indicator in the coaxial system is indicated diagrammatically by a switching arrangement. Although coaxial switches are available to provide connections such as those shown, it is preferable, in practice, to connect the signal generator and the reflectionless termination directly to the ends of the insertion wave indicator or reflectometer. The possibility of reflections occurring in the coaxial system through the use of switches is thus avoided. Furthermore, only a single signal generator and a single termination 100 would normally be employed, the reflectometer merely being "reversed" in the line to reverse the relative direction of the travelling wave energy for test and calibration purposes. The arrangement of FIG. 6, therefore, is to be considered as a convenient illustration of the reversing principle, rather than a physical circuit for use in practice. For purposes of illustration, however, FIG. 6 represents an equivalent arrangement using two signal generators of identical character and two reflectionless terminations 100 connected through coaxial switches 101 and 102 to the opposite ends of the reflectometer.

During the first phase of the test and adjustment the left hand signal generator delivers a signal or travelling wave to the left end of the reflectometer through the switch 101, the right hand end being connected by the switch 102 to one of the reflectionless terminations. A suitable termination for such purpose comprises an outer circular sectioned conductor in the form of a tapered metal horn and an inner resistive conductor in the form of a carbon film disposed on a cylindrical ceramic rod clamped at one end in the small diameter end of the horn. The termination may, for example, be of the oil filled or liquid dielectric coolant type constructed in accordance with the disclosure of copending application for patent Serial No. 777,516, filed October 2, 1947, now Patent No. 2,556,642.

With electrical energy in the form of a travelling wave progressing from left to right, as viewed in FIGS. 1 and 6, the minor or branch coaxial lines within the main or outer transmission line develop signals in accordance with the travelling wave energy theory.

FIG. 7 represents the bridge circuit of the present invention as "seen" by a travelling wave to which the circuit must not respond. For purposes of explanation those components of the reflectometer or wave indicator device that constitute what is referred to as a reflection unit and that are located on the right of the middle or dividing plane are indicated in FIG. 7, the components being disposed in the arrangement of a bridge circuit. It is to be understood, however, that FIG. 7 also represents the electrical connections or arrangement of the bridge circuit of the unit located on the left of the symmetry plane 29 as such circuit is presented to wave energy to which the left hand unit is intended to be insensitive or responseless. The several points of connection of the circuit components have been designated by letters "a" through "g," corresponding points in the FIG. 6 diagram being similarly lettered. During the test setup mentioned, with the reflectionless termination 100 connected on the right hand end of the device, the characteristic impedance $Z_0$ of the main transmission line constitutes that branch of the bridge which extends between the connection points $b$ and $c$.

In accordance with accepted theory the bridge circuit of FIG. 7 can be represented by the equation:

$$Z_0/SRr = BRr/TRr \qquad (1)$$

$$BRr SRr = Z_0 TRr \qquad (2)$$

Since $Z_0$, the characteristic impedance of the transmission line, is customarily fixed by the practice in the trade, and since, as previously explained, $TRr$ (or $TRf$) is purposely designed to equal the characteristic impedance $Z_0$, the right hand side of Equation 2 is established for any device to be designed.

It follows that the values of $BRr$ (or $BRf$) and $SRr$ (or $SRf$) are mutually dependent upon one another and must be such that the bridge circuit balances. It would be misleading, therefore, to assign a specific value or range of values for either the series resistor $SRr$ (or $SRf$) or the bridging resistor $BRr$ (or $BRf$). Not only does alteration of the value of one such resistor require a compensating alteration in the value of the other resistor for the purpose of maintaining balance in the bridge circuit, but a change in the value of the characteristic impedance of the main transmission line (which calls for a corresponding change in the value of the termination resistor $TRr$ (or $TRf$)) requires a change in either the series resistor or the bridging resistor or both the series and the bridging resistors.

The normal situation calls for a bridging resistor $BRr$ (or $BRf$) much larger than the series resistor $SRr$ (or $SRf$), in fact, the bridging resistor is usually many, many times greater than the series resistor. It has been found desirable to make the series resistor very small, values under 2 ohms being preferable, usually less than 1 ohm. Thus the bridging resistor $BRr$ (or $BRf$) is very large, being as much as several thousand ohms. With a series resistor $SRr$ (or $SRf$) of from about .5 ohm to 1 ohm the bridging resistor $BRr$ (or $BRf$) can be in the neighborhood of about 4,000 ohms to about 2,000 ohms. The particular ratio to be used in selecting the values of the series and bridging resistors depends upon the measuring range or sensitivity desired. The greater the resistance of the bridging resistor $BRr$ (or $BRf$) relative to the resistance of the series resistor $SRr$ (or $SRf$) the less is the sensitivity or signal response of the device. An increase in the series resistor would require a decrease in resistance of the bridging resistor thereby causing a relatively larger flow of current or energy in the branch or sampling line which includes the bridging resistor $BRr$ (or $BRf$).

Therefore, a galvanometer of high sensitivity is used, one that responds to relatively low currents, so that it operates on low direct current voltage put out by the diode rectifier 43. Thus the required high frequency voltages on the sampling circuit comprising the resistors $BRf$, $TRf$ and $SRf$ (or $BRr$, $TRr$ and $SRr$) are relatively small and the sampling circuit resistors can be so selected, in accordance with the principles set out above, as to produce minimum attenuation and other undesirable effects on the line. The galvanometer circuit may include a calibrating resistance 86 within the meter box. The bridging resistor is adjusted as by means of the contact screw 77 which alters the effective length of the resistor. This adjustment is made in balancing the bridge circuit and compensating for any deviations from the theoretical values of Equation 2 such as may result from field effect. It is thus seen that regardless of the magnitude or character of power or energy delivered into the left hand end of the transmission line by the signal generator, the resistors of the bridge can be so balanced that a null appears across the connection points $e$—$c$. Reversely travelling or reflected wave energy is, of course, eliminated by the reflectionless termination so that the transmission line is free of waves travelling from right to left.

In the event that the pointer of the galvanometer $Gr$ is deflected under such conditions, it is an indication of a state of unbalance in the electrical bridge circuit. Adjustment is effected by means of the screw 77 (FIG. 1) of the right hand unit which, by increasing or decreasing the length of the film resistor $BRr$ brings the bridge into balance so that the desired null is present across the connection points $e$—$c$. In this condition of balance, indicated by a zero reading on the indicator or galvanometer $Gr$, the voltage drop across the termination resistor $TRr$ (which forms one component of the voltage divider) is substantially equivalent to the voltage drop across the series resistor $SRr$. It is required, of course, that the transmission line be reflectionlessly terminated during this adjustment of the bridge circuit, so that no wave be travelling in a reverse direction on the transmission line.

FIG. 8 represents the bridge circuit of the present invention as "seen" by a travelling wave to which the circuit is intended to respond. For purposes of explanation the components of the device located to the left of the center or dividing plane of FIGS. 1 and 6 are indicated. These components are presented to the forward travelling wave fed into the line by the signal generator connected to the left end of the device as a bridge circuit which is not balanced and accordingly responds to the wave energy, such response being indicated by deflection of the galvanometer pointer. It is to be understood, however, that FIG. 8 also represents the arrangement of the bridge circuit of the unit located on the right of the plane of symmetry of the device as such circuit is presented to wave energy to which the right hand unit is intended to respond. In the condition represented in FIG. 8 a null is not present so that wave energy travelling from left to right is "seen" by the galvanometer or indicator circuit. As energy is delivered from the signal generator to the left end of the reflectometer device and, through the latter, to the reflectionless termination, the indicator instrument or galvanometer $Gf$ registers the presence of the current by pointer deflection.

The accuracy of the indication or reading of the galvanometer $Gf$ is dependent upon adjustment of the bridging resistor $BRf$. This adjustment is accomplished by a procedure for balancing the bridge similar to that described in connection with FIG. 7. The set up for balancing the left hand unit is obtained by reversing the reflectometer in the transmission line, or as suggested above, by a switching arrangement which connects the signal generator to the right hand end of the reflectometer and connects the reflectionless termination at the left hand end of the reflectometer, all as shown by the broken lines of FIG. 6. When the device is so "reversed" in the line, the components of the left hand unit of FIGS. 1 and 6 then present a bridge circuit to the travelling wave from the generator which corresponds to the arrangement shown in FIG. 7 in connection with the explanation of the adjustment of the reflection sensitive unit. With the wave energy being thus delivered to the right hand end of the device as viewed in FIG. 6, the left hand end being properly or reflectionlessly terminated, the bridging resistor BR$f$ is adjusted to balance the series resistor SR$f$ so that the desired null is obtained across the connection points $c$—$e$ and a zero reading appears on the indicator or galvanometer G$f$. In this condition of balance, the voltage drop across the termination resistor TR$f$ is substantially equal to the voltage drop across the series resistor SR$f$.

When inserted into a transmission line, the reflectometer or indicator, both units or branch lines of which have been balanced as described above so that the respective bridge circuits each null out the effect of a wave propagated one in a forward direction and the other in a reverse direction, functions to indicate the magnitude of wave energy travelling in both directions. Each unit of the reflectometer is a nulled bridge to travelling wave energy propagated in one direction on the transmission line in which the reflectometer is inserted. To waves such as reflections generated or propagated in the other or reverse direction, each unit is a combined ammeter and voltmeter which, properly calibrated, functions as a wattmeter for power transmitted over the line. In the arrangement illustrated, wherein two units are combined in a single reflectometer device, one of the units may be designated, arbitrarily, to indicate power propagated in the "forward" direction, the other unit then is designated, also arbitrarily, to read reflected power or power propagated in a "reverse" direction. These readings, occurring simultaneously, yield a fix on the standing wave ratio which can be interpreted by a comparison bridge. The new power transfer as it occurs on the transmission line at the place of insertion of the reflectometer is thus obtainable.

Upon insertion of the reflectometer into a transmission line so that, in lieu of the reflectionless termination 100, the right hand or outlet end of the reflectometer, as viewed in FIGS. 1 and 6, is connected to an imperfect load such as indicated in FIG. 1, the load becomes a virtual generator, reflecting a portion of the high frequency energy delivered to it. The imperfect termination or load thus gives rise to a reflected wave that is propagated reversely or back through the transmission line and through the reflectometer in a reverse direction or from right to left as viewed in FIGS. 1 and 6. To this reflected wave the signal generator at the left of the transmission line appears as a reflectionless or perfect termination. This is believed to be apparent since a reflection entering the signal generator becomes a component of the generated or forwardly travelling incident wave. The absolute amplitude or absolute phase changes in the output of the generator do not adversely affect the accuracy of the indication or reading given by the reflectometer of the present invention.

To the reflected wave from the imperfect load on the right hand end of the transmission line the reflectometer unit on the left of the dividing plane of the device presents a balanced bridge circuit nulling the effect of the reflected wave at the detector. This nulling circuit for the left unit is a reversal of, although otherwise the same as, the nulling circuit for the right unit represented by the arrangement of components illustrated in FIG. 7. The reflectometer unit to the right of the median plane presents to the reflected wave a wave-responsive circuit which is energized by the reflected wave. Energization of the branch line circuit appears as a deflection of the pointer of the galvanometer G$r$ which thus registers the presence and magnitude of the reflected wave. This wave-responsive circuit for the right unit is a reversal of, although otherwise the same as, the wave-responsive circuit for the left unit represented by the arrangement of components illustrated in FIG. 8. Thus the unit on the left of the middle or symmetry plane 29, when properly calibrated, measures wave energy or power propagated from left to right and is insensitive to reflected power or power propagated from right to left toward the signal generator. The reflectometer unit on the right of the median plane, however, insensitive to the wave energy or power from the signal generator travelling from left to right or forwardly, registers only that power which is reflected from the imperfect termination and appears at the reflectometer in the form of a reversely travelling wave moving from right to left.

In each of the units of the reflectometer assembly, the resistors BR$f$ and TR$f$ (or BR$r$ and TR$r$) constitute a resistive voltage divider functioning in accordance with the principles set forth in patent application Serial No. 191,805 referred to above. These resistors, in effect, constitute a means for obtaining a voltage sample which is a predetermined small fractional portion of the voltage of the wave travelling in the transmission line. The corresponding transmission line voltage sampled is that of the forwardly travelling wave in the case of the left hand unit and that of the reflected wave in the case of the right hand unit. This relationship is maintained over a very broad band of operating frequencies and the response of the instrument remains so uniform, its characteristic curves are so "flat," that it is substantially insensitive to frequency over those ranges for which the particular device is designed.

Also, in each unit of the reflectometer, the series resistance SR$f$ (or SR$r$) is present on and at the diameter of a conductor, here the center conductor, of the main transmission line. A voltage is developed across the series resistor which is a direct function of the current flowing in the main line. Thus the main line current is conveniently sampled.

The voltage sample component and the voltage sample component which results from the current sample are added vectorially, rectified, and impressed on the coil of an indicating instrument such as the galvanometer represented in the drawings, the relative magnitudes of the two components being proportioned to satisfy the characteristic impedance of the transmission line.

It is significant that the present wave indicator, which locates the rectifier physically within the inner conductor of the main transmission line, has short connections giving dimensions so small in that region of the circuit that would otherwise be sensitive to phase shift occurring before vectorial addition that the balance and accuracy of the device is maintained over a wide frequency range. It has been found in practice that the balance of the bridge circuit remains satisfactory over a frequency band which includes the major portion of the commercial frequencies, the device being substantially free of objectionable unbalance at frequencies under about 2,000 megacycles.

Such reflections as are introduced into the main transmission line by the resistors of the units are not objectionable. The combination of the series and shunt resistors SR$f$ (or SR$r$) and BR$f$ (or BR$r$) is an approximation of or is in the nature of an attenuator pad and interference with the characteristic impedance of the transmission line by these components is thus minimized. The pad effect is further enhanced by the equality of the termination resistor TR$f$ (or TR$r$) with respect to the main line impedance $Z_0$. The resistance of SR$f$ (or SR$r$), less than 1 ohm in the device described, is relatively so small compared to the characteristic impedance of the transmission line, here 51.5 ohms, that the pad attenuation is not objectionable. The location of SR$f$ (or SR$r$) physically close to BR$f$ (or BR$r$) accomplishes the taking of both current and voltage samples approximately at the same radial plane of the transmission line. This result is beneficial as mentioned above in connection with the taking and vectorial addition of the voltage and current samples without phase shift. The physically close relationship between the series and bridging resistors is also beneficial in connection with the attenuator pad action of the resistor combination.

The tap resistors 89 which carry the direct current component of the sample voltage to the external portion of the galvanometer circuit are of relatively high resistance, preferably being upwards of 3,000 ohms. This high resistance avoids objectionable reflections and other effects on the main transmission line. Even higher resistances may be employed; the higher the resistance of the tap resistor, the less disturbing is its effect on the transmission line.

For certain applications, it is feasible to replace the series resistor SR$f$ (or SR$r$) with a conductor which may take the form of a metal turning having the same shape as the ceramic body 17. In such absence of the series resistor SR$f$ (or SR$r$) the modified indicator unit, properly calibrated, responds as a voltmeter. The feeding of known power into the voltmeter arrangement at various frequencies yields data useful in calibrating the voltmeter as to characteristics or "flatness" with respect to frequency.

In another arrangement, the bridging resistor BR$f$ (or BR$r$) is omitted, the voltage drop across the series resistor SR$f$ (or SR$r$) causing the device to respond as an ammeter. By conventional procedures for feeding known powers into the device at various frequencies it is readily calibrated for current sensitivity over the desired frequency band.

Although the invention has been disclosed in a two unit reflectometer, the principles involved have wide application, it being feasible to employ a structure incorporating one of the units in combination with a reflectionless termination as a voltmeter or wattmeter. A device incorporating one of the bridge circuit units and capable of being inserted, say, in an antenna lead will monitor a control circuit for shutting down a transmitter in the event of antenna damage.

In accordance with the patent statutes the principles of the present invention may be utilized in various ways, numerous modifications and alterations being contemplated, substitution of parts and changes in construction being resorted to as desired, it being understood that the article and apparatus shown in the drawings and described above and the particular method set forth are given merely for purposes of explanation and illustration without intending to limit the scope of the claims to the specific details disclosed.

What we claim and desire to secure by Letters Patent of the United States is:

1. In a high frequency electrical measuring instrument, an inner conductor and an outside conductor arranged in a major coaxial line and said conductors being separated from one another by an annular dielectric space, said inner conductor being formed with an internal chamber, a center conductor and an outer conductor arranged in a minor coaxial line disposed wholly within the internal chamber and intermediate the ends of the inner conductor of the major coaxial line, said center and outer conductors of the minor line being separated by an annular dielectric space continuous with the internal chamber of the inner conductor, an electrical indicator external to the outside conductor, an electrical circuit means having electrical connection with the inner and outside conductors of the major line and with the center and outer conductors of the minor line connecting the indicator in a closed circuit for response to wave energy transmitted along the major line, said circuit means comprising resistor means connected in such a way that wave energy traveling along the transmission line produces a voltage drop across such resistor means and induces an electrical current to flow in the indicator circuit said circuit means including a rectifier disposed within said chamber of the inner conductor wholly within the axial limits of the inner conductor and an elongated resistor connected in series with the rectifier and with the indicator, said elongated resistor being disposed with its long axis extending substantially radially across the first-named dielectric space.

2. A high frequency electrical device comprising a main coaxial transmission line having inner and outside conductors separated by an annular dielectric, circuit means arranged to sample energy carried by the main line, said circuit means including a minor coaxial line having center and outer conductors within the inner conductor of the main line, the outer conductor of the minor coaxial line being connected to the inner conductor of the main transmission line, a portion of the center conductor of the minor coaxial line being resistive, voltage divider means connected across the main transmission line and including said resistive portion of the center conductor a rectifier within the inner conductor of the main line and connected in the circuit of the minor line, a direct current indicator external to the main transmission line, and a radially disposed access conductor series connected between the indicator and the center conductor, said access conductor extending from the center conductor of the minor coaxial line, through the outer conductor of the latter, across the annular dielectric and through the outside conductor of the main line to carry rectified sample energy from the minor coaxial line to the external indicator, said radial access conductor having a resistive portion in the annular dielectric the resistance of which portion is many times the characteristic impedance of the transmission line and of an order sufficiently high to produce negligible shunting effect across said main transmission line.

3. A high frequency electrical device comprising a main coaxial transmission line having inner and outside conductors separated by an annular dielectric, circuit means arranged to sample energy carried by the main line, said circuit means including a minor coaxial line having center and outer conductors within the inner conductor of the main line, the outer conductor of the minor coaxial line being connected to the inner conductor of the main transmission line, a portion of the center conductor of the minor coaxial line being resistive, voltage divider means connected across the main transmission line and including said resistive portion of the center conductor a rectifier within the inner conductor of the main line and connected in the circuit of the minor line, a direct current indicator external to the main transmission line, a radially disposed access conductor series connected between the indicator and the center conductor, said access conductor extending from the center conductor of the minor coaxial line, through the outer conductor of the latter, across the annular dielectric and through the outside conductor of the main line to carry rectified sample energy from the minor coaxial line to the external indicator, said radial access conductor having a resistive portion in the annular dielectric the resistance of which portion is many times the characteristic impedance of the transmission line and of an order sufficiently high to produce negligible shunting effect across said main transmission line, means capacitively coupling the radially inner end of the resistive portion of the access conductor to the inner conductor of the main line, and means capacitively coupling the radially outer end of the resistive portion of the access conductor to the outside conductor of the main line substantially to confine high frequency currents absorbed by the resistive portion of the access conductor in the annular dielectric to the access conductor portion between the capacitive coupling means while permitting the passage of said rectified sample energy.

4. A high frequency electrical device comprising a main coaxial line for transmitting wave energy, said line having inner and outside conductors and an annular dielectric separating such conductors, in which dielectric, wave energy being transmitted sets up a high intensity field, circuit means arranged to sample energy carried by the main line, said circuit means including a resistive voltage divider connecting the inner and outside conductors of the transmission line, the voltage divider comprising series connected resistors one of which is disposed in the annular dielectric and subjected to the electrical field of transmitted energy, one of the conductors of said main transmission line including a relatively resistive portion intermediate the ends of such line and of substantially the same cross sectional size and shape as the line conductor of which it is a portion, said resistive portion of the transmission line conductor being electrically connected as one component of the sampling circuit whereby a voltage drop across such resistive conductor portion resulting from wave energy in the main coaxial transmission line induces current flow in the sampling circuit, a rectifier within the inner conductor of the transmission line and intermediate the ends of the latter, means connecting the rectifier in the sampling circuit to rectify current induced in such sampling circuit, an indicator external to the main transmission line, and means including said one resistor of the resistive voltage divider connecting the rectifier to the indicator for carrying rectified current across the electrical field.

5. A high frequency electrical device as defined in claim 4 in which said one resistor of the voltage divider is of high impedance relative to the characteristic impedance of the main transmission line.

6. A high frequency electrical device as defined in claim 4 in which said means connecting the rectifier to the indicator also includes another resistor of high impedance relative to the characteristic impedance of the main transmission line disposed in and extending across the annular dielectric of the main line and spaced axially of the main line from said one resistor of the voltage divider.

7. A high frequency electrical device as defined in claim 4 which includes a reflectionless termination comprising another of the voltage divider resistors and a tubular conductor surrounding said other resistor in coaxial relation, said other resistor comprising an elongated rod disposed within and coaxial to the inner conductor of the main line, the tubular conductor also being within said inner conductor, and the tubular conductor being connected at one of its ends to one end of said other resistor and at the other of its ends to the inner conductor of the main line.

8. A high frequency electrical device comprising a main coaxial line for transmitting wave energy, said line having inner and outside conductors and an annular dielectric separating such conductors, in which dielectric wave energy being transmitted sets up a high intensity field, circuit means arranged to sample energy carried by the main line, said circuit means including a resistive voltage divider connecting the inner and outside conductors of the transmission line, the voltage divider comprising series connected resistors one of which is disposed in the annular dielectric and subjected to the electrical field of transmitted energy, a reflectionless termination located within the inner conductor of the main line, said termination comprising another of the voltage divider resistors and an outer tubular conductor surrounding said other resistor in coaxial relation, the tubular conductor being connected at one end to said other resistor of the voltage divider and at the other end to the inner conductor of the main line, one of the conductors of said main transmission line including a relatively resistive portion intermediate the ends of such line and of substantially the same cross sectional size and shape as the line conductor of which it is a portion, said resistive portion of the transmission line conductor being electrically connected as one component of the sampling circuit whereby a voltage drop across such resistive conductor portion resulting from wave energy in the main coaxial transmission line induces current flow in the sampling circuit, a rectifier within the inner conductor of the transmission line and intermediate the ends of the latter, means connecting the rectifier in the sampling circuit to rectify current induced in such sampling circuit, an indicator external to the main transmission line, and means including said one resistor of the resistive voltage divider connecting the rectifier to the indicator for carrying rectified current across the electrical field.

9. A device for insertion in an electrical coaxial transmission line as an energy transmitting unit for use in the detection of high frequency electrical wave energy traveling along such line substantially without interfering with or altering the character of such energy, said device comprising a chambered inner conductor and an outside conductor surrounding the inner conductor in spaced relation, said conductors being concentrically arranged as a main coaxial line, a tubular element disposed within the chamber of the inner conductor and located wholly intermediate the ends of the latter, a coaxially disposed conductor within and in spaced relation to said tubular element, said tubular element comprising the outer and said last named conductor comprising the center conductors of an auxiliary coaxial line, said inner conductor of the main line said said tubular element being formed with aligned openings through which the space between the conductors of the main line is in communication with the space between the center and the outer conductors of the auxiliary line, and a sampling circuit comprising series connected resistor and rectifier elements extending axially through the inner conductor of the main line, an indicator external to the main line, and a conductor disposed radially across the space between the conductors of the main line, said radial conductor being connected in said sampling circuit serially with said indicator and extending through the aligned openings of the said inner and outer conductors to carry rectified current across the space between the inner and the outside conductors.

10. A device for use in detecting high frequency wave energy traveling along an electrical coaxial transmission line, said device comprising a chambered inner conductor of circular section and an outside conductor surrounding the inner conductor in spaced relation, said conductors being arranged coaxially as a main line in which an annular dielectric space surrounds the inner conductor and separates the latter from the outside conductor, an elongated conductor disposed within the chamber of the inner conductor as the center conductor of an auxiliary coaxial line, means within the inner conductor of the main line providing a conductive surface coaxial to the elongated center conductor of the auxiliary line to function as the outer conductor of the latter, the center and outer conductors of the auxiliary line being separated by another annular dielectric space, the inner conductor being formed with axially spaced openings through which the dielectric spaces of the lines are in communication, resistive radial conductors spaced axially along the main line and extending across the dielectric space surrounding the inner conductor, through the spaced communication openings in the latter and connected to the center conductor of the auxiliary line, an indicator external to the main line, and a sampling circuit comprising a rectifier disposed within the inner conductor of the transmission line and including the radial resistive conductors connecting the indicator to the center conductor of the auxiliary line, the radial resistive conductors being connected serially with the indicator to carry rectified current across the space between the inner and the outside conductors.

11. In a device for use in detecting high frequency wave energy traveling along an electrical coaxial transmission line as defined in claim 10, said elongated center conductor of the auxiliary line including a resistive portion, and said sampling circuit including means connecting said resistive conductor portion and one of said resistive radial conductors as a resistive voltage divider across the conductors of the main transmission line.

12. A device for use in detecting high frequency wave energy traveling along an electrical coaxial transmission line, said device comprising a chambered inner conductor of circular section and an outside conductor surrounding the inner conductor in spaced relation, said conductors being arranged coaxially as a main line in which an annular dielectric space surrounds the inner conductor and separates the latter from the outside conductor, said inner conductor including a metal tubular portion of substantially circular section, an element disposed wholly within the diameter of the inner conductor and wholly intermediate the ends of the latter, said element including a tubular metal portion of substantially circular section embraced by the tubular portion of the inner conductor, one of said tubular portions being axially slotted for radial expansion and contraction in yieldingly engaging the other, a conductor disposed in the tubular element as the center conductor of an auxiliary coaxial line of which the tubular element constitutes the outer conductor, the center and outer conductors being separated by another annular dielectric space, the center conductor including a resistive portion and the tubular element including a tapered portion surrounding such resistive portion in the provision of a reflectionless termination on the auxiliary line, an indicator external to the main line, and a sampling circuit connecting the center conductor of the auxiliary line to the indicator, said sampling circuit also including conductor means extending radially across the dielectric space and serially connected with the indicator to carry current to the indicator across such dielectric space.

13. In a device of the type used in detecting high frequency wave energy traveling along an electrical coaxial transmission line, said device being of the type comprising a chambered inner conductor of circular section and an outside conductor surrounding the inner conductor in spaced relation, said conductors being arranged coaxially as a main line in which an annular dielectric space surrounds the inner conductor and separates the latter from the outside conductor and said inner conductor includes a metal tubular portion of substantially circular section, a combined resistor and auxiliary coaxial line assembly carried by and within the inner conductor, said assembly comprising an insulator having a circular sectioned resistive film conductor the surface of which is approximately the same diameter as the tubular portion of the inner conductor, an element disposed wholly within the diameter of the inner conductor and wholly intermediate the ends of the latter, said element including a tubular metal portion of substantially circular section embraced by the tubular portion of the inner conductor, the insulator and the tubular metal portion of the element being telescopically interfitted in mutually supporting relation, a center conductor extending axially through the element and including a resistive portion, the element being formed with a tapered interior conductive surface coaxial to the resistive portion of the center conductor in the provision of a reflectionless termination on the auxiliary line, an indicator external to the main line, and a circuit including the resistive film conductor, the center conductor means of the auxiliary line, and radial conductor means extending across the dielectric space of the main line and to the center conductor of the auxiliary line connecting the indicator in series with the center conductor to respond to current in such circuit resulting from the voltage drop across the resistive film conductor prevailing during the transmission of wave energy on the main line.

14. Coaxial electrical line structure comprising a main transmission line which includes a hollow inner conductor and a tubular outside conductor surrounding the inner conductor in spaced coaxial relation, insulators in the outside conductor supporting the inner conductor at its ends, said inner conductor comprising an assembly of circular sectioned metal tubes disposed in alignment with their ends in spaced confronting relation, tubular insulator means interposed in the space between the tube ends, said insulator means having substantially cylindrically shaped resistive film conductor means concentric to the axis of the tubes and electrically connected to the latter, auxiliary coaxial lines disposed interiorly of the inner conductor, each auxiliary line having a center conductor and an outer conductor, the outer conductor of each auxiliary line including a portion of the resistive film conductor means as one component thereof, each auxiliary line also including a reflectionless termination comprising a resistor, voltage divider means comprising the termination resistors and radial resistor means connected between the center conductors of the auxiliary lines and the outside conductor of the main line, indicators external to the outside conductor, and circuit means including a rectifier and a radial conductor extending from the center conductor of one of the auxiliary lines across the space between the inner and outside conductors connecting each of the auxiliary lines in series with an indicator to respond to current in each such auxiliary line resulting from voltage drop across one of the voltage divider resistors and across the resistive film conductor means prevailing during the travel of electrical wave energy along the main line, each such connecting circuit means being arranged as a bridge which produces said indicator response to wave energy traveling in one direction by cumulating the voltage drops across the voltage divider resistor and the resistive film conductor means and which produces a null in response to wave energy traveling in a reverse direction by opposing such voltage drops.

15. A resistive reflectometer device insertable in an electrical coaxial line to sample wave energy traveling along such line for high frequency electrical measurements, said device comprising a chambered inner conductor and an outside conductor arranged as a major coaxial line and separated from one another by an annular dielectric space, a pair of minor coaxial lines disposed in end to end relation within and wholly intermediate the ends of the inner conductor, said minor lines each comprising an outer conductor and a center conductor, nonreflecting means terminating each of the minor lines and including a resistor, means electrically connecting one of the center conductors to the outside conductor and including a radial resistor disposed in the said annular dielectric space, the resistor of one of the terminating means and the radial resistor constituting a resistive voltage divider connected across the major coaxial line, electrical indicators, and circuits connecting the indicators between the outside conductor of the major coaxial line and the center conductors of the minor coaxial lines, said indicator circuits each including a resistor disposed in the said annular dielectric space and connected in series with the indicator and to the center conductor of the minor line, one of said indicators being so connected as to respond to electrical wave energy traveling in one direction along the major coaxial line and another of said indicators being so connected as to respond to electrical wave energy traveling in a reverse direction along the major coaxial line, whereby wave energy traveling in said one direction along the major coaxial line is detected substantially solely by the one indicator and wave energy traveling in said reverse direction along such major line is detected substantially solely by the other indicator.

16. In a resistive reflectometer device as defined in claim 15, the inner conductor of the major coaxial line including axially relatively short annular thin resistive film means, said annular resistive film means being connected in the indicator circuits, and the response of each indicator being a function of the current of the corresponding electrical energy passing said annular resistive film means.

17. In an instrument for high frequency electrical measurements, a coaxial electrical transmission line unit comprising an inner conductor and an outside conductor concentrically arranged, means on the opposite ends of the transmission line unit for connecting the opposite ends of the inner and outside conductors to the ends of corresponding conductors of other coaxial transmission lines so that the line unit can be connected to receive traveling electrical wave energy from one such other line and to transmit the received energy to another such line, a pair of resistors connected in series across the inner and outside conductors of the line unit as a voltage divider, a portion of the inner conductor comprising a film resistor to develop a voltage drop, an auxiliary coaxial line located within the inner conductor and having a center conductor which includes one of the voltage divider resistors and an outer conductor which includes said film resistor, said voltage divider resistors and said film resistor being so selected and connected to the conductors of the line unit as to comprise three sides of a four sided balanced electrical bridge circuit of which the impedance of the line unit constitutes the fourth side, a rectifier disposed wholly within the inner conductor of the coaxial line unit and spaced axially from both ends of such inner conductor, means connecting the rectifier across opposite corners of the bridge circuit between the juncture of the voltage divider resistors and one end of the film resistor to provide a bridge detector arm, said bridge connections being such that electrical wave energy traveling through the line unit in one direction induces cumulative currents in the film resistor and one of the divider resistors and electrical wave energy traveling in the other direction through the line unit induces opposed currents in the film resistor and such one of the divider resistors, an indicator located outside the transmission line unit, and means connecting the indicator across the rectifier to respond to conditions of unbalance across said opposite corners of the bridge circuit.

18. A device for measuring the ratio of the incident and reflected travelling waves present on a transmission line connecting an energy source and a load over a wide frequency range comprising a first and second Wheatstone bridge type circuit each including respectively a fixed resistive voltage divider connected to said transmission line as the first and second legs of each bridge, a pair of resistance elements one coupled between the first leg of the first bridge and the source and the other coupled between the first leg of the second bridge and the load providing the third leg of each of said bridges, the source providing the fourth leg of said first bridge and the load providing the fourth leg of said second bridge, a pair of rectifier elements each coupled respectively to the junction of the third and fourth legs of said bridge circuits and to the junction of said first and second legs of said bridge circuits, the output of said first bridge circuit yielding a voltage proportional to the incident travelling wave on said transmission line and the output of said second bridge circuit yielding a voltage proportional to the reflected travelling wave on said transmission line.

References Cited in the file of this patent
UNITED STATES PATENTS

| | | |
|---|---|---|
| Re. 20,859 | Potter | Sept. 13, 1938 |
| 1,985,095 | Hoare | Dec. 18, 1934 |
| 2,109,843 | Krassner | Mar. 1, 1938 |
| 2,273,547 | Von Radinger | Feb. 17, 1942 |
| 2,399,645 | Latimer | May 7, 1946 |
| 2,416,694 | Howard | Mar. 4, 1947 |
| 2,423,447 | Grimm | July 8, 1947 |
| 2,464,277 | Webber | Mar. 15, 1949 |
| 2,474,794 | Van Beuren | June 28, 1949 |
| 2,498,335 | Hunt | Feb. 21, 1950 |
| 2,502,657 | Lindenblad | Apr. 4, 1950 |
| 2,529,436 | Weber et al. | Nov. 7, 1950 |
| 2,547,411 | Rambo | Apr. 3, 1951 |
| 2,563,613 | Ohl | Aug. 7, 1951 |
| 2,588,390 | Jones | Mar. 11, 1952 |
| 2,686,295 | Griemsmann | Aug. 10, 1954 |

FOREIGN PATENTS

| | | |
|---|---|---|
| 648,450 | Great Britain | Jan. 3, 1951 |